United States Patent [19]
Benjamin

[11] 4,328,621
[45] May 11, 1982

[54] POSITION SENSING DEVICE

[76] Inventor: Harry L. Benjamin, 1000 Brittany Hills Dr., Dayton, Ohio 45459

[21] Appl. No.: 152,220

[22] Filed: May 22, 1980

Related U.S. Application Data

[63] Continuation-in-part of Ser. No. 109,722, Jan. 4, 1980, which is a continuation-in-part of Ser. No. 843,414, Oct. 19, 1977, abandoned.

[51] Int. Cl.³ .................. B27G 23/00; G01B 7/18; G01B 7/30
[52] U.S. Cl. .................. 33/174 L; 33/185 R; 33/DIG. 13
[58] Field of Search .......... 33/174 L, 185 R, DIG. 13

[56] References Cited

U.S. PATENT DOCUMENTS

| | | | |
|---|---|---|---|
| 2,495,797 | 1/1950 | Whitlock et al. | 33/DIG. 13 |
| 3,040,435 | 6/1962 | Huyser | 33/174 L |
| 3,696,513 | 10/1972 | Sullivan | 33/174 L |
| 3,707,043 | 12/1972 | Jones | 33/185 R |
| 3,724,084 | 4/1973 | McNeece | 33/174 L X |
| 4,060,906 | 12/1977 | Heizmann | 33/DIG. 13 |

*Primary Examiner*—Charles A. Ruehl
*Attorney, Agent, or Firm*—Biebel, French & Nauman

[57] ABSTRACT

A position sensing device having a plurality of angular position sensing probes movably mounted within a support member for simultaneously engaging a surface when the support member is moved into proximity with the surface. Transducers associated with each of the probes sense movement thereof and provide electrical output signals indicative of the positions of the probes relative to the support member. The relative separation between the support member and the surface is determined through the calibrated movement of at least one of the probes as indicated through the signals of the associated transducer. Lateral position sensing is provided through a central probe mounted in cantilevered fashion to the support member, with two transducers positioned in orthogonal planes on the lateral position sensing probe which provide an indication in which direction the sensing device must be moved in order to eliminate sideway forces acting on the lateral position sensing probe.

13 Claims, 15 Drawing Figures

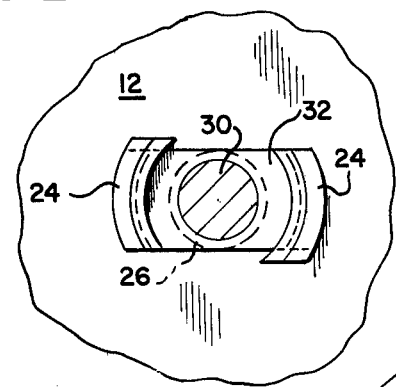
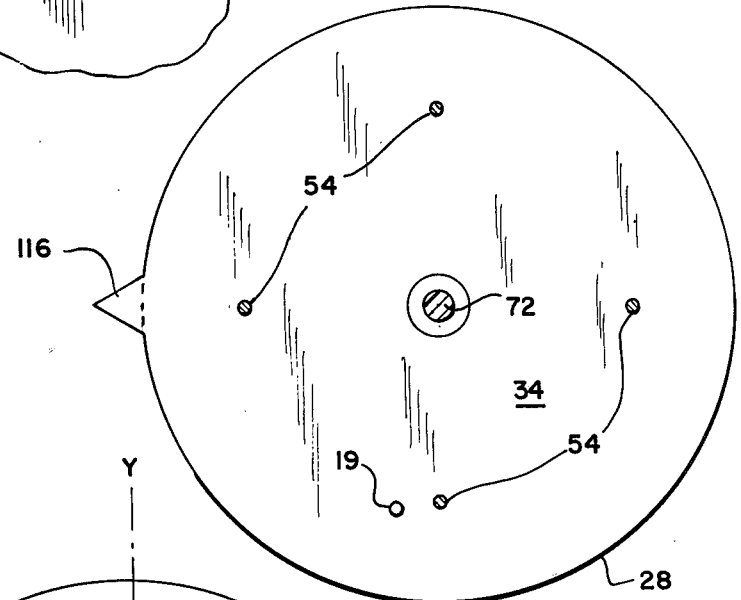
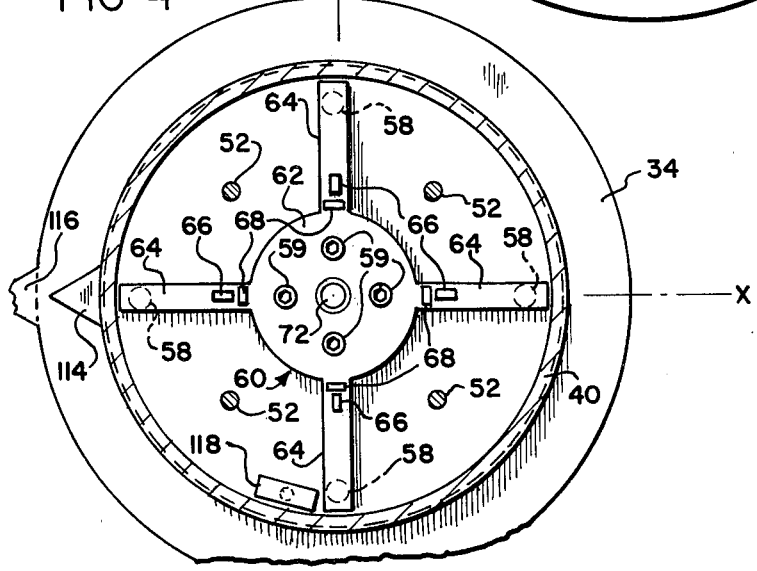

POSITION SENSING DEVICE

CROSS REFERENCE TO RELATED APPLICATION

This application is a continuation-in-part of application Ser. No. 109,722 filed Jan. 4, 1980 which, in turn, is a continuation-in-part of application Ser. No. 843,414, filed Oct. 19, 1977, now abandoned.

BACKGROUND OF THE INVENTION

1. Field of the Invention

The present invention relates to devices for sensing the relative position between the device and a surface, through the use of contacting probes which extend from the device to the surface.

2. Prior Art

For some time, there has been a need for a device which can sense the relative perpendicularity of the device to a surface, and/or the relative angularity of the device to a surface, and which provides an immediate visual indication of the relationship of the device to the surface with sufficient information to permit an operator to manually adjust the orientation of the device, or the surface, to obtain the desired perpendicularity or angularity, as the case may be. Such a device is needed which is also easily portable and relatively inexpensive and easily adaptable to various uses without requiring major changes in its construction.

In addition to the above described desirable features, it is also desirable in certain industries to have a device which can sense the distance from the device to the surface so that the device is not only positioned perpendicular or at a desired angle to the surface, but is also at the required distance from the surface. It is further desirable to provide means for locating the device at a precise point on the surface through lateral movement of the device or the surface. Such devices would have major uses in establishing exact drilling locations, for example, and for use in "teaching" industrial robots which are capable of remembering the location of a position in space once the robot has been removed to that location.

Presently it is a common practice to teach such robots by bringing the robot arm into approximate alignment with the surface, through visual observations and utilizing the driving mechanism of the robot. Then, while the robot arm drive operator continues to move the arm into a more precise orientation relative to the surface, an assistant constantly measures and checks the progress and advises the robot operator of the direction and amount of movement which he feels is necessary in order to bring the robot into the desired exact location. This takes considerable labor and is extremely tedious and time consuming when a multitude of such locations are to be programmed into the robot before it performs its actual intended operation on the surface.

SUMMARY OF THE INVENTION

The present invention overcomes the above described difficulties and disadvantages associated with the prior art devices by providing a position sensing device which indicates the relative perpendicularity or angularity between the device and a surface, and in addition, if desired, can also provide an indication of the distance from the device to the surface, and further, can provide an exact alignment with a point on the surface.

These advantages are achieved through a position sensing device which includes a support member, a plurality of angular position sensing probes movably mounted within and extending from the support member for simultaneously engaging a surface when the support member is moved into proximity with the surface, a plurality of transducers mounted to the support member and engaging the probes for sensing movement thereof and providing electric signals indicative of the positions of each of the probes relative to the support member, and circuitry receiving the signals from the transducers and providing an indication of the relative angular position of the support member to the surface.

At least one of the probes and its associated transducer can be calibrated to indicate the relative separation between the support member and the surface in order to provide an indication of the distance from the support member to the surface. In addition, a lateral position sensing probe can be utilized which can engage a discontinuity in the surface, such as a hole, and provide an indication of the alignment of the support member with the hole.

In its preferred form, this latter feature is attained by use of a lateral position sensing probe which is mounted to the support member and extends therefrom for engaging the discontinuity in the surface so as to cause bending of the lateral position sensing probe upon lateral movement of the support member when the probe is engaged in the discontinuity. A transducer engages the lateral position sensing probe and senses the bending thereof and provides an electrical signal indicative of the degree of bending. A signal receiving device receives the signal from the transducer which engages the lateral position sensing probe and provides an indication of the degree of bending of the probe.

Further, in its preferred form, two transducers, such as strain gages, are mounted to the lateral position sensing probe in orthogonal planes and provide an indication of the direction of bending which, through the signal receiving device, can provide a visual indication of the direction of movement necessary to properly align the support member with the discontinuity in the surface.

BRIEF DESCRIPTION OF THE DRAWINGS

FIG. 2 is a cross sectional view along line 2—2 of FIG. 1;

FIG. 3 is a cross sectional view along the line 3—3 of FIG. 1;

FIG. 4 is a cross sectional view along the line 4—4 of FIG. 1;

DETAILED DESCRIPTION OF THE PREFERRED EMBODIMENT

Figure 1:
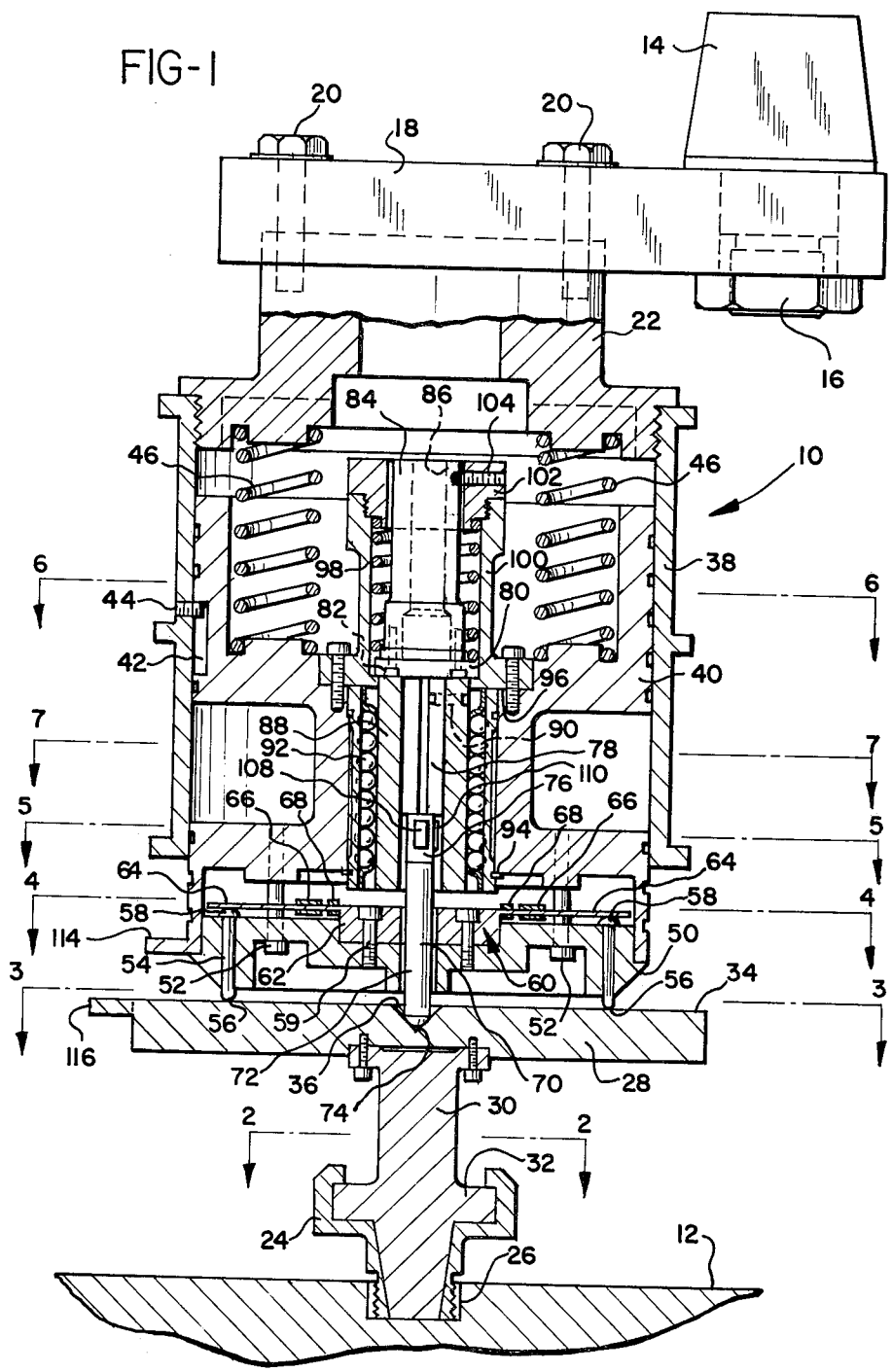
FIG. 1 is a cross sectional view of a preferred embodiment of the present invention, illustrating the position sensing device in engagement with a surface.
Figure 5:
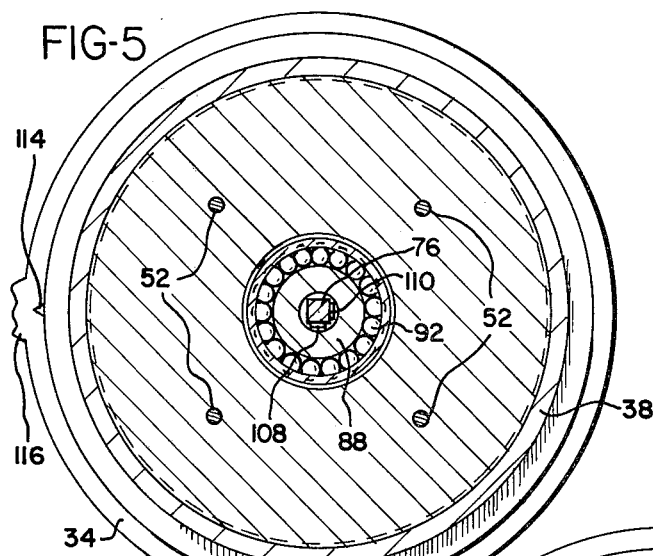
FIG. 5 is a cross sectional view along the line 5—5 of FIG. 1.

The preferred embodiment of the position sensing device 10 of the present invention includes the basic features disclosed in the above referred to related applications (and those applications should be referred to for additional understanding of the present invention), but also includes improvements thereover and additional features as set out in detail below.

The position sensing device 10 is illustrated in a form for use in "teaching" an industrial robot of conventional construction the proper location for drilling in reference to a surface 12 of some object such as a drilling fixture beneath which is positioned a piece (not shown) to be drilled. For this particular application a truncated cone-shaped member 14, adapted to fit into the industrial robot arm (not shown), is exactly positioned offset from the center line of the position sensing device 10 the same distance that a drill holder will eventually be positioned during the actual drilling operation. Member 14 is bolted with bolt 16 to a positioning arm 18 which, in turn, is bolted with bolts 20 to the upper cylindrical cap 22 of position sensing device 10.

In addition to being properly offset from the position where the member 14 engages the robot arm, the distance from the member 14 to the surface 12 must also be exact since it must be the same as when the actual drill holding device and drill (not shown) are mounted to the robot arm. In addition, in this particular environment the actual drilling device must engage and rotate into locking position with a bayonet-type locking member 24 which has been previously mounted in a threaded bushing 26 already positioned in the body of the drilling fixture. It was therefore necessary in this particular embodiment to package the position sensing device 10 in an envelope which would fit within these dimensions. This, however, is not to be construed as a limitation on the actual size or shape of the present invention since these factors can vary significantly for a given requirement for its use.

Also, since the position sensing device 10 is not actually being used in this environment to sense a particular surface, but rather a position in space relative to the locking member 24, a temporary adapter plate 28 has been provided which is secured to a support column 30 which has segmented lugs 32 that matingly engage the locking member 24 when the support column 30 is rotated. Thus, the upper surface 34 of adapter plate 28 provides the surface which the position sensing device will actually engage and sense for properly positioning the robot arm relative to the surface 12 of the workpiece to be drilled. Adapter plate 28 is cylindrical, although this is not necessary, and has a conical bore 36 concentrically aligned with the axis of the hole to be drilled in surface 12.

Figure 6:
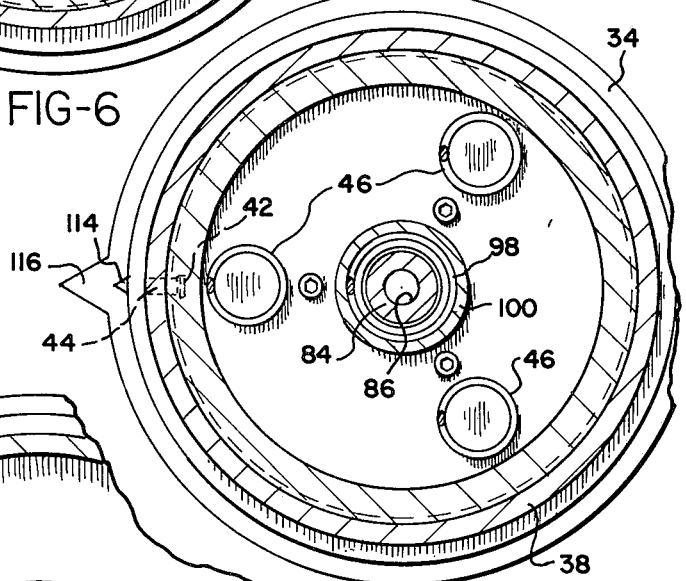
FIG. 6 is a cross sectional view along the line 6—6 of FIG. 1.
Figure 7:
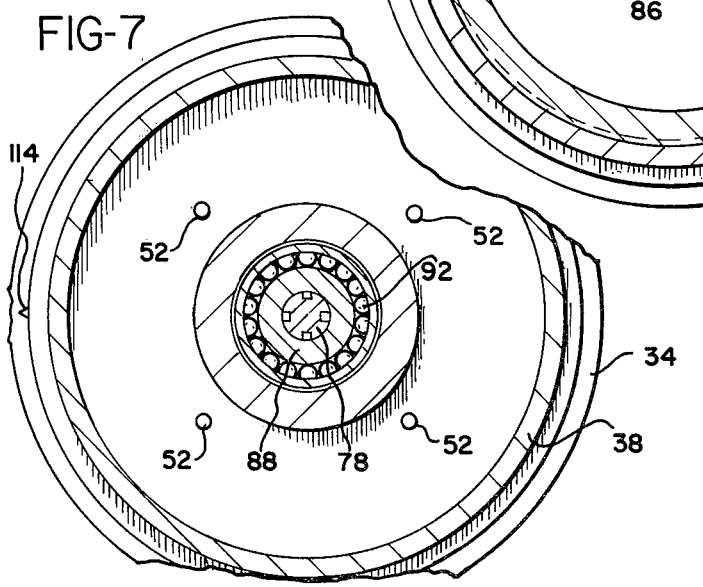
FIG. 7 is a cross sectional view along the line 7—7 of FIG. 1.

Referring now to the details of the position sensing device 10 as illustrated in FIG. 1, a main cylindrical housing 38 is provided into which is threadedly received the upper cylindrical cap 22. Cap 22 supports the housing 38 from the support arm 18. Slidably engaged within cylindrical housing 38 is the main support member 40 which is also generally cylindrical in form. A vertically extending slot 42 is formed in the side of support member 40 in alignment with a screw 44 threadedly received in the housing 38 and extending into the slot 42 for holding the support member 40 within the housing 38 while permitting limited relative movement of the support member within the housing. The vertical extent of the slot is sufficient to permit the necessary sliding movement of the support member 40 within housing 38 during operation of the device as discussed below. Three compression springs 46 (see FIG. 6) engage the inner surface of upper cylindrical cap 22 and the upper surface of the cylindrical recess in support member 40 to bias the support member 40 outward of the housing against the screw 44. These springs are provided only to permit the support member 40 to telescope into the housing 38 to prevent damage to the robot arm and are therefore of sufficient strength to maintain the support member in the extended position during normal operation of the device.

A generally disc-shaped plate 50 forms a bottom end closure for the support member 40 and is bolted thereto with a plurality of bolts 52. A series of four pins 54 are mounted in corresponding holes in plate 50 for sliding movement therein. Pins 54 have outer semi-spherical ends 56 which engage the surface 34. The upper ends of pins 54 have enlarged semi-spherically shaped heads 58 which prevent the pins from passing out through the holes in plate 50. The four pins 54 are positioned at equally angularly and radially spaced locations around the plate 50 from the central vertical axis of the plate and the device 10. Pins 54 constitute the angular position sensing probes of the preferred embodiment of the present invention which engage the surface 34 and move independently to indicate any angular offset in perpendicularity between the surface 34 and the central axis of plate 50 and thus the central axis of the position sensing device 10.

Also bolted to plate 50 by a plurality of bolts 59 is a pin movement sensing plate 60. Plate 60 has a central cylindrical main body portion 62 and four thin cantilevered extensions 64, each of which corresponds to an associated pin 54 and engages the top semi-spherical end portion 58 of each. Sensing plate 60 is preferably made of steel which permits sufficient bending of the cantilevered extensions 64 for the desired degree of movement of pins 54 within the plate 50 while staying within the elastic region of the material of plate 60 so that an essentially linear deformation occurs in the extensions during bending thereof due to a pin or pins 54 being pushed upward so as to bend the extensions. The cantilevered extensions 64 can either be integrally formed with or made separately from and secured to the main body portion 62.

Pairs of strain gages 66 and 68 are mounted perpendicular to one another on each of the cantilevered extensions 64 and provide an indication of the strain on each of the cantilevered extensions when they are bent due to upward movement of the associated pin 54. The strain gages 66 and 68 in conjunction with the cantilevered extensions 64 thus form the transducers of the present invention which give an extremely acurate indication of the relative movement of the pins 54 in plate 50. The extent of movement of the pins can thus be exactly correlated through the bending of extensions 64 and the corresponding change in resistance in the strain gages.

Also mounted within the main support member 40 is a lateral position sensing probe 70. In the preferred embodiment the lateral position sensing probe 70 has a lower cylindrical portion which terminates in a semi-spherical end portion 74. At its upper end portion the cylindrical portion 72 joins a rectangular cross section portion 76 which, in turn, joins another, but larger diameter, generally cylindrical portion 78. Cylindrical portion 78 in turn joins a disc-shaped cap 80. Bolted to the top of cap 80 through the plurality of bolts 82 is a stepped shaft 84 with a central bore 86 extending therethrough. The cylindrical portion 78 is fitted in a cylindrical sleeve which is pinned to the cylindrical portion 78, such as by roll pin 90, extending through a common bore in the side of the sleeve and the cylindrical portion 78.

The assembly of the lateral position sensing probe 70, stepped shaft 84 and sleeve 88 is then mounted in a linear motion ball bushing 92, such as is available from Thompson Industries, Inc., Manhasset, N.Y., which is fitted in an internal bore in support member 40 so that the probe can move vertically along its central axis. The ball bushing 92 is preferably used to reduce as much as possible the friction due to movement of the probe within the support member 40. Ball bushing 92 is held in place in the support member 40 with snap rings 94 and 96 at the top and bottom of the ball bushing, respectively.

The probe 70 is biased downwardly as shown in FIG. 1, by cylindrical compression spring 98 which is housed within a sleeve 100. Compression spring 98 is held at a predetermined compressed height between the upper surface of the cap 80 of the probe 70, and a cap 102 which is threadably engaged in the upper end portion of sleeve 100. A screw 104 extends through the top 102 into a vertical slot 106 in the upper end portion of stepped shaft 84 to keep the probe aligned with the x and y axes of the device. The spring 98, prevents damage to probe 70 and permits the probe to retract into the support member if too great a side ways force is applied to the probe which might otherwise damage it. Also, springs 98 permit probe 70 to retract into support member 40 as pins 54 telescope into the support member when the device is moved toward the surface 34. The spring 98 also permits the probe to widen the sensing area beyond what it would be if the probe were fixed in the support member 40 and only permitted to bend, since the probe 70 can ride up the sides of the cone-shaped opening 36.

Figure 15:
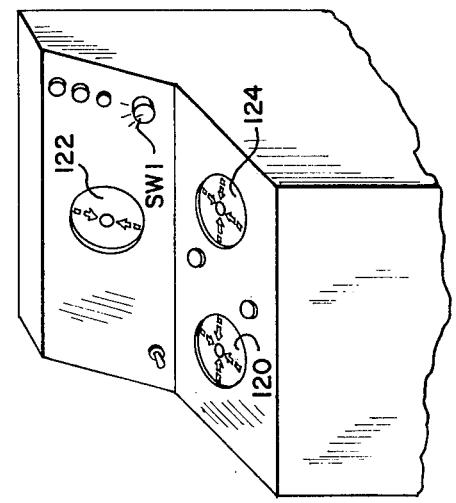
FIG. 15 is a pictorial view of a control counsel housing the circuitry and the visual indicators for the preferred embodiment of the present invention.

Two strain gages 108, 110 are mounted to adjacent perpendicular sides of rectangular cross section portion 76 of probe 70, and their lead wires (not shown) extend through the vertical slot 112 in the side of cylindrical portion 78 and then through the hollow central bore 86 of shaft 84 and out through the upper portion of the device. None of the lead wires from any of the strain gages are illustrated for the sake of clarity, however, it is apparent that lead wires must extend from each of the strain gages, referred to above, out of the device and into the control panel illustrated in FIG. 15 where the circuitry of FIGS. 8 through 14 is contained.

As mentioned above, in the particular environment where the preferred embodiment of the present invention was designed to function, i.e. as a robot teacher, it was also necessary to provide a means for indicating rotational alignment of the device 10 with the surface 34 in order to eventually permit the robot teacher to lock the drilling apparatus into the locking member 24. In order to provide an initial visual indication of the approach of this condition, a pointer 114 is mounted at the lower end portion of support member 40 and a corresponding pointer 116 is mounted to the side of disc 28 at a location which is in proper alignment for indicating the locked condition between the support column 30 and locking member 24. Thus, when the device 10 is rotated about its central axis the two pointers 114 and 116 will come into alignment to indicate the locked condition.

In addition, to provide greater accuracy in rotational alignment for locking, an infrared LED source and a photo detector are fitted into a holder 118 which is precisely positioned around the periphery of plate 50 which will indicate the precise locked-up position with the actual drilling device in the locking member 24. The photo detector will sense a change in the signal received as a bounce-back from the surface 34 from the infrared LED, when the light strikes a change in the surface, such as a contrasting line, hole, slot etc., like spot 19 which is positioned in the plate 28 at the precise location to indicate the locked-up condition between the column 30 and locking member 24. The photo detector will indicate an increased voltage when the light source strikes the surface contrast which voltage change is used to activate a light and thus indicate exact alignment.

Figure 8A:
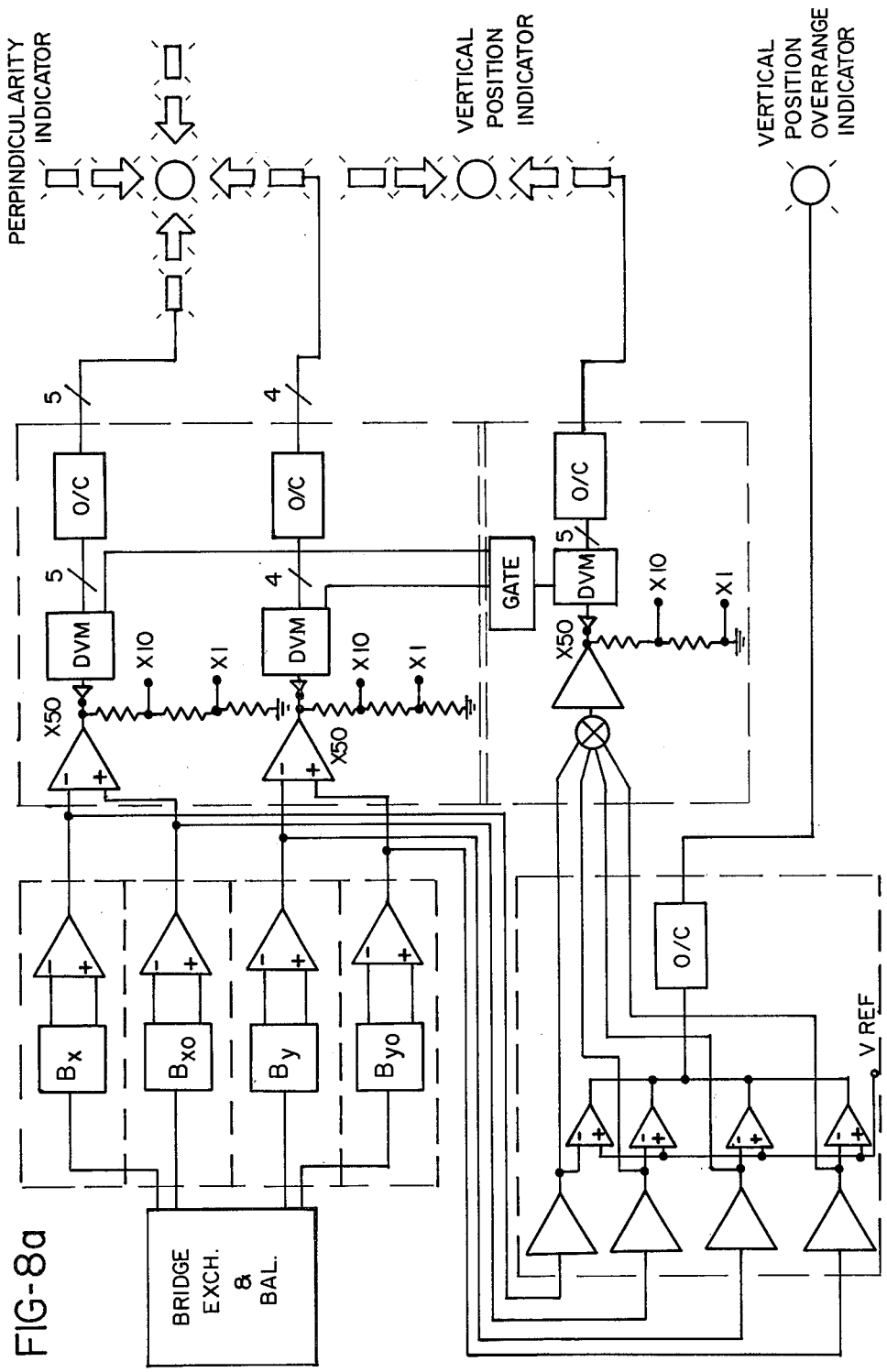
FIGS. 8a–14 illustrate the circuitry which utilizes the signals from the various transducers to provide a visual indication of the relative position between the support member and the surface being sensed.
Figure 8B:
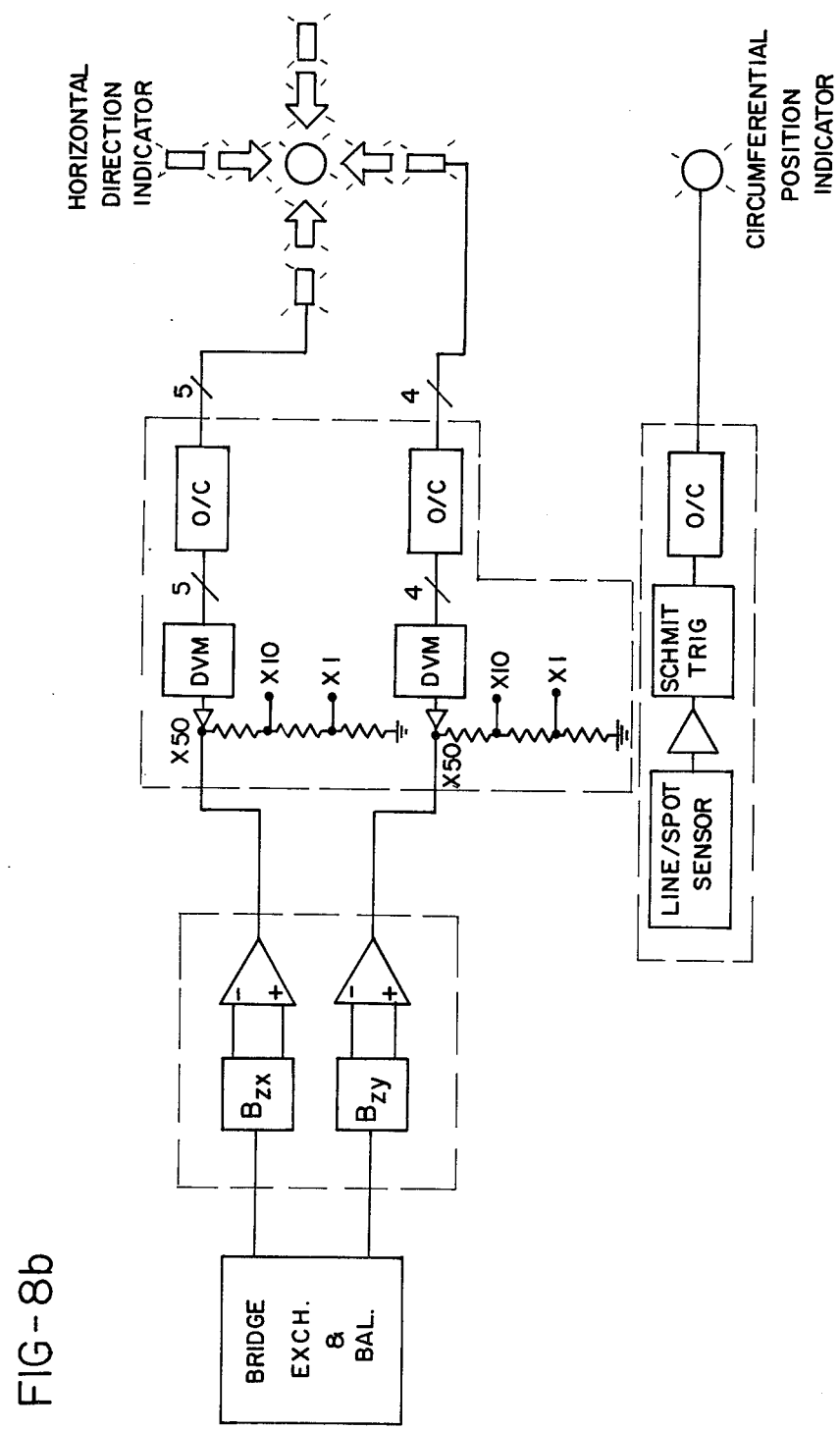
Figure 9:
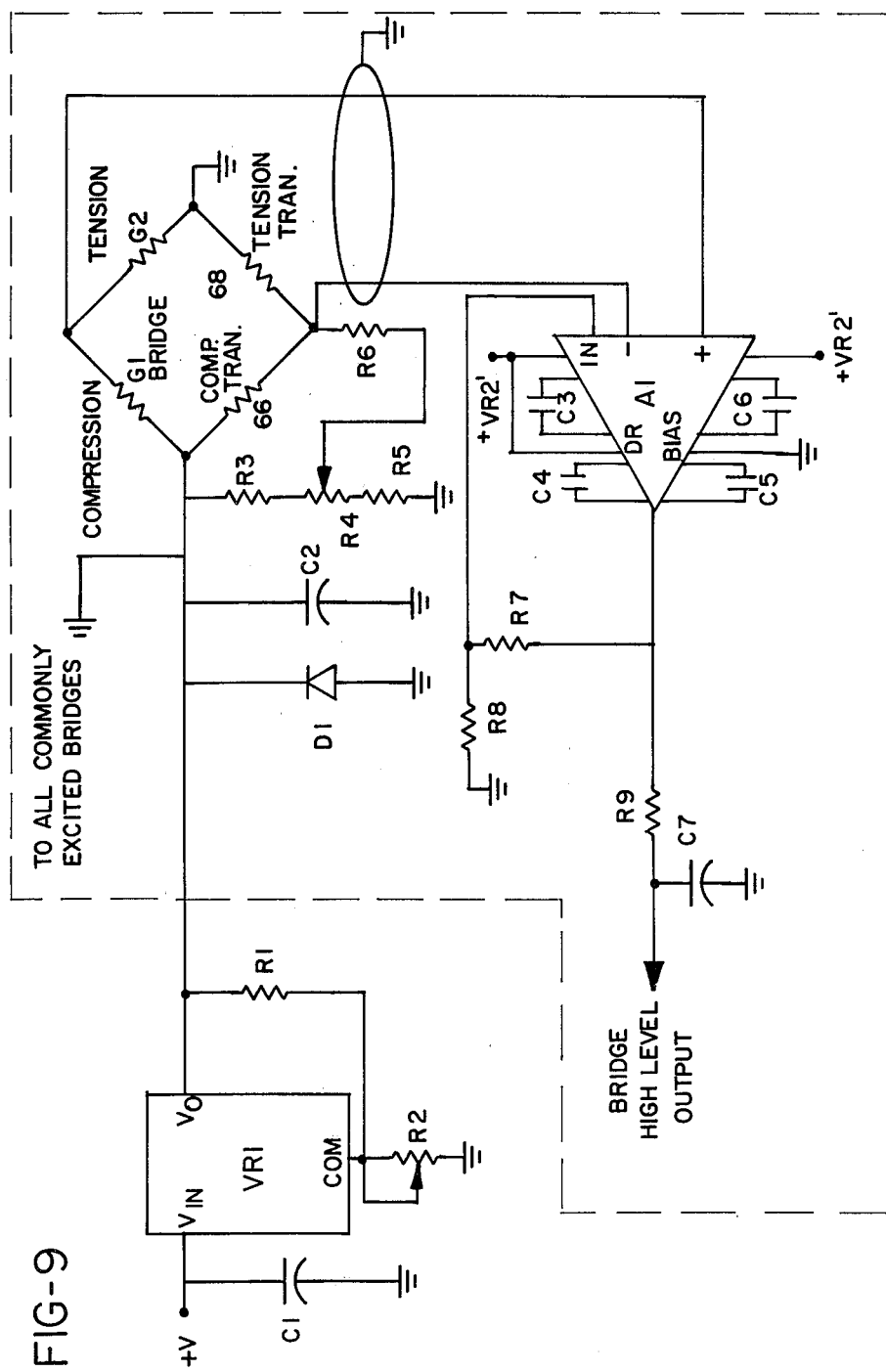

Referring now to the circuitry of FIGS. 8 through 14, FIGS. 8a and 8b are simplified block diagrams which indicate the interconnection of the circuitry illustrated in greater detail in FIGS. 9 through 14. The circuit of FIG. 9 illustrates the amplifying circuit associated with a single set of strain gages 66 and 68 associated with a single cantilevered extension 64, and as indicated in FIG. 8a, there are actually four sets of circuitry identical to FIG. 9, with the exception of the voltage regulator $V_{R1}$, in order to operate the four sets of strain gages 66 and 68 associated with each of the four cantilevered extensions 64.

The circuit of FIG. 9 provides regulated excitation voltages to the sets of strain gages 66 and 68, amplifies the low level bridge output from each set of strain gages and filters out any frequency above 10 Hz.

$V_{R1}$ is a four terminal, adjustable, precision voltage regulator. The resistor ratio R1/R2 sets the level of the regulated output Vo. The voltage regulator eliminates any significant change in bridge output as a function of variation in the supply voltage V+, bridge current or ambient temperature and reduces the ripple factor from the power supply by 60 db.

Capacitors C1 and C2 stabilize the regulator and improve its transient response. Diode D1 protects the regulator from reverse voltage transients due to static discharges. Resistors R3 through R6 form a null circuit to balance out any unloaded or residual imbalance in the installed bridges.

The use of the particular amplifier A1, as designated in the parts list set out below, is especially helpful in this circuit. This amplifier automatically corrects itself for any internal offset or long term drift eliminating the need for a trim pot and permitting functional operation (i.e., precision tracking) at the very low (0–10 MV) output levels that would ordinarily be precluded by the fact that amplifier drift would exceed this range.

The amplifier A1 gain is established by resistor ratio R7/R8 at a level that will prevent saturation at full scale deflection of the instrumented cantilever extensions 64. Capacitors C3 through C6 are required by the commutating feature of the amplifier A1. Resistor R9 and capacitor C7 form a low pass (10 Hz) filter to remove the commutating/switching transients from the amplifier output.

Figure 10:
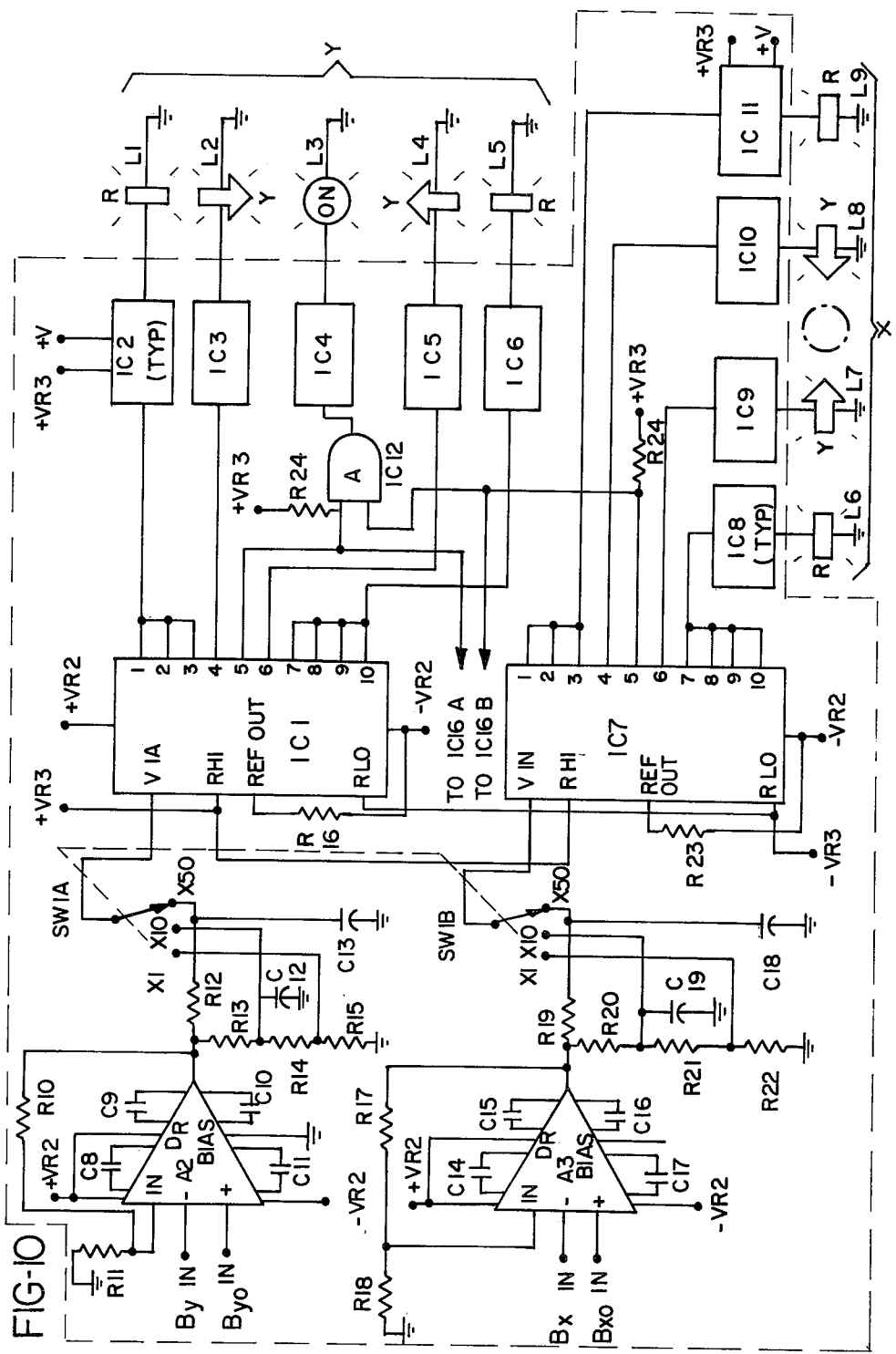

The bridge high level outputs from the circuit of FIG. 9 associated with each set of strain gages 66 and 68 and which correlate to the x and y axes are input into the circuitry of FIG. 10. The high level outputs of the strain gage bridges on the two instrumented cantilever extensions in the x axis (Bx and Bxo) and the two instrumented cantilever extensions in the y axis (By and Byo) of the pin movement sensing plate 60 are differentially summed by amplifiers A2 and A3.

Pure axial (vertical) movement of the main support member 40 will result in equal and same direction deflections of the cantilever extensions 64 and the output of amplifiers A2 and A3 will not change. Any inclination of the vertical axis of the device relative to the target surface 34 will result in an unequal deflection of the cantilever extensions in one or both axes. The output of amplifiers A2 and/or A3 will increase and the polarity of the output will correspond to the extension with the highest stress, thus indicating direction of tilt in both of the two mutually orthogonal axes.

The full scale output from amplifiers A2 and A3 is determined by the resistor voltage divider formed by resistors R13 through R15 and R20 through R22. Switch SW1 establishes the desired sensitivity for the device. Capacitors C12, C13 and C18, C19 form a 10 Hz, low pass filter with the voltage divider resistors.

The outputs of A2 and A3 are coupled to digital voltmeter (DVM) integrated circuits (IC) IC1 and IC7, respectively. The DVM's normally drive the lamps, turning on lamp L1 at 10% of full scale input, lamp L2 at 20%, etc.—lamp L10 at 100% of full scale. For this application a biasing network consisting of the positive and negative voltage reference VR3 shifts the operating point of the DVM's to cause the lamp L5 to be lit with no input from amplifiers A2 or A3. Positive voltage swings from amplifiers A2 or A3 turn on outputs 6 through 10 of IC1 and IC7, respectively, in a linear step sequence and negative voltage swings turn on outputs 4 through 1 of IC1 and IC7, respectively, in a similar manner.

The maximum number of indicator lamps driven by any one DVM is five. Outputs 3 through 7 of IC1 and IC7 are utilized in this design (5 being center). Outputs 8, 9 and 10 are "or" tied to output 7 and outputs 1 and 2 are "or" tied to output 3. Any voltage swing beyond the level normally indicated by outputs 3 or 7 will thus maintain an output at 3 or 7 until the input level falls back within the range of output 3 through 7.

The DVM outputs 3 through 7 of IC1 and IC7 are connected to opto-couplers IC2 through IC6 and IC8 through IC11, respectively. The DVM output turns on a light emitting diode (LED) within the opto-coupler. The light is sensed by a photo transistor which turns on an associated driver transistor to light the miniature incandescent lamps L1 through L9.

The DVM outputs 5 on IC1 and IC7 are effectively "ored" together such that a logical low output from either device will turn on lamp L3 through IC4. The output 5 on both devices is also coupled to the circuit of FIG. 12 where they are combined to develop a gate signal that controls the display format of the vertical position indicator.

Figure 11:
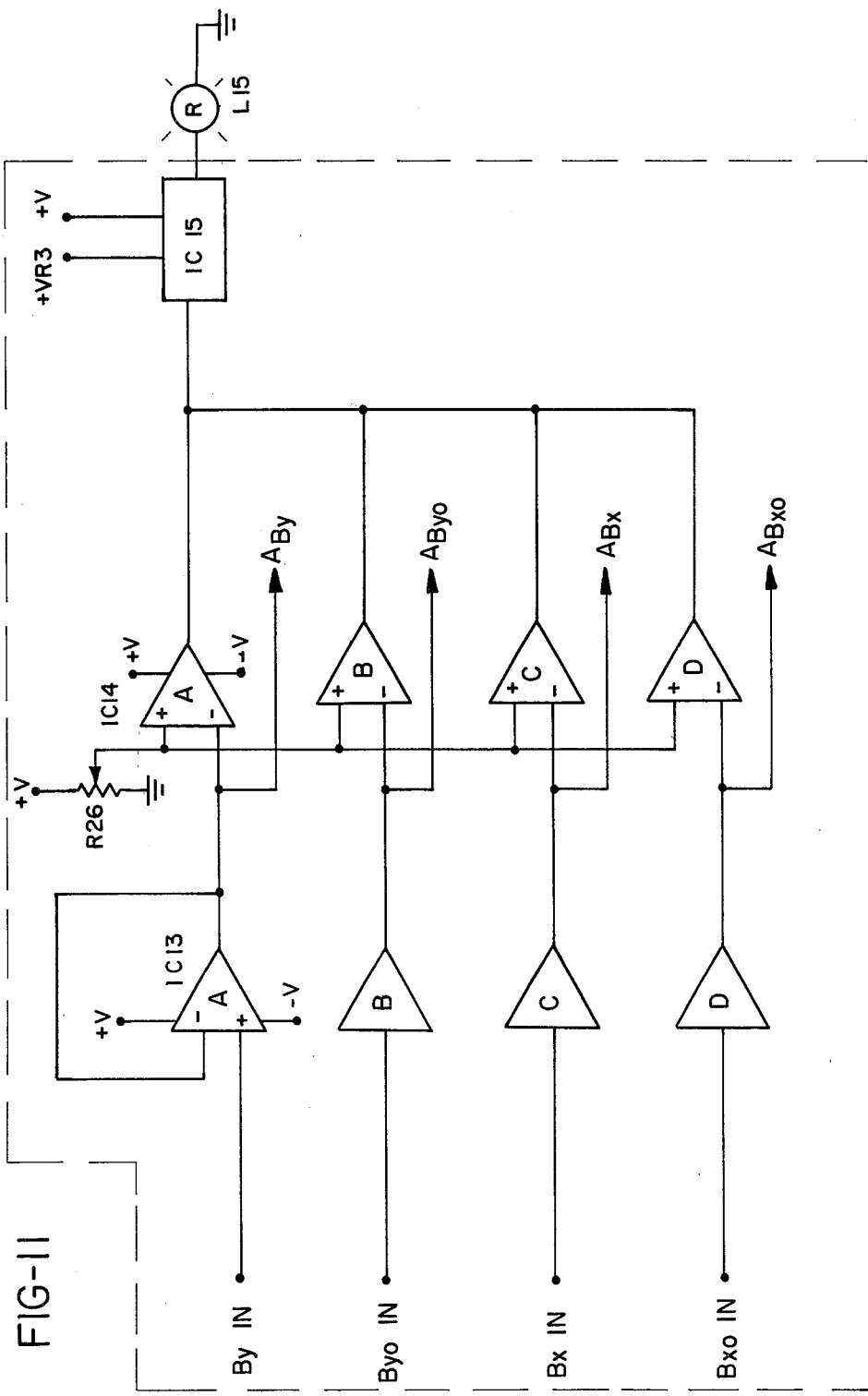

As shown in FIGS. 8a and 11, the high level outputs from the strain gages associated with each of the four instrumented cantilever extensions are buffered with unity gain amplifiers IC13A through D and coupled to QUAD comparators IC14A through D. The comparators change state whenever any one of the four inputs exceed the reference level which is set by trim pot R26 to be nearly equal to the full scale output of the respective bridges.

The comparator outputs are "or" tied to opto-coupler IC15 which turns on over range indicator lamp L15 when any bridge output exceeds the reference level.

Figure 12:
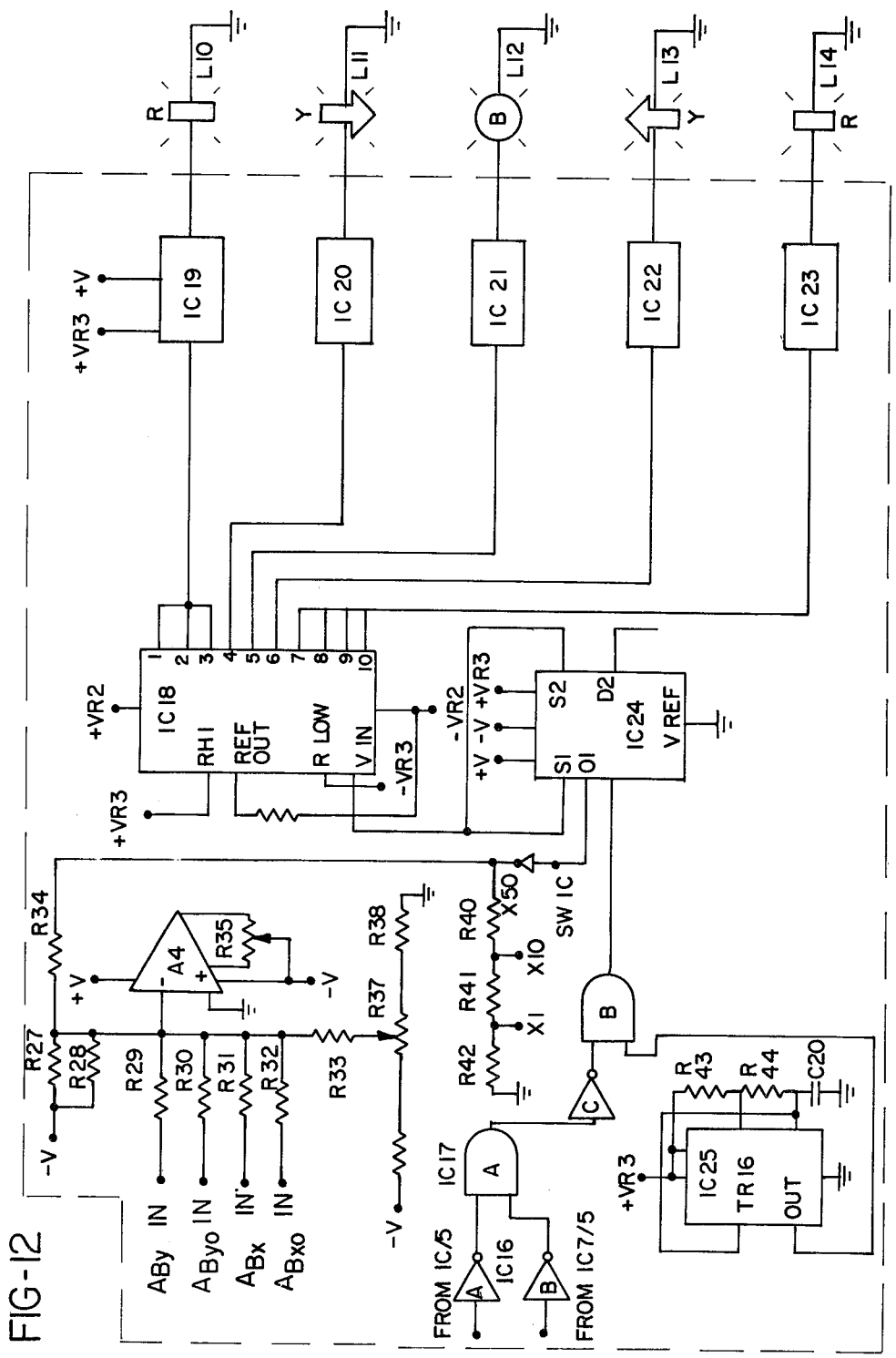

The high level buffered bridge outputs $A_{By}$, $A_{Byo}$, $A_{Bx}$ and $A_{Bxo}$ from the circuit of FIG. 11 are summed, as shown in the circuit of FIG. 12, with fixed bias source through resistors R27 and R28 and adjustable bias source resistors R36, R37 and R38. The gain of amplifier A4 is set to the level that all four bridge outputs must reach, approximately $\frac{1}{2}$ of full scale, to offset the negative bias sources and achieve zero output from amplifier A4. Digital voltmeter IC18 will then turn on indicator lamp L12 through opto-coupler IC21, indicating that the device is positioned a precise distance above the target surface.

Any vertical movement above or below this level will swing the output of ICA4 through the calibrated range of DVM IC18, causing indicator lamps L10 through L14 to display the actual deviation in linear increments thus providing both direction and magnitude of deviation information to the operator to allow him to correctly position the device at the calibrated height above the target surface 34.

The full scale output of ICA4 is reduced in two steps by voltage dividers R40 through R42. Switch SW1C selects the desired full scale output level to establish the sensitivity of the vertical position display.

Vertical position can only be accurately defined when the vertical axis of the device is perpendicular to the target surface 34. Perpendicularity is indicated by logical low (0) levels at the inputs to IC16A and B (See FIG. 10).

IC16A and B change the logical low signals to logical highs which then cause a logical high at AND gate IC17A. This output is inverted by IC16C. This logical low signal is coupled to AND gate IC17B resulting in a logical low at the input to solid state switch IC24. This signal turns on the solid state switch IC24, coupling amplifier A4 output to DVM IC18. The vertical display is now enabled and indicator lamps L10 through L14 operate in the normal manner as long as the perpendicularity of the device to the target surface 34 is maintained.

Tilting the vertical axis of the device in any direction will cause an amber indicator light to come on in one or both axes of the perpendicularity display. One or both of the gating signals from IC12A, FIG. 10, will change to a logical high which will result in a high to AND gate IC17B, which then couples the 1 Hz square wave generated by IC25 to the input of the solid state switch IC24. Resistors R43 and R44 and capacitor C20 set the oscillation frequency of IC25.

The switch will turn on and off at the 1 Hz rate, switching the DVM input between -VR3 and A4 to cause the vertical display indicator lamps L10 through L14 to flash at the same rate, indicating that the displayed position indicated by lamps L10 through L14 is not valid until the tilt in the vertical axis of the device is corrected, returning the display to the normal constant on condition. Switch SW2 provides a means to abort the flashing display feature for initial setup, testing or training.

Figure 13:
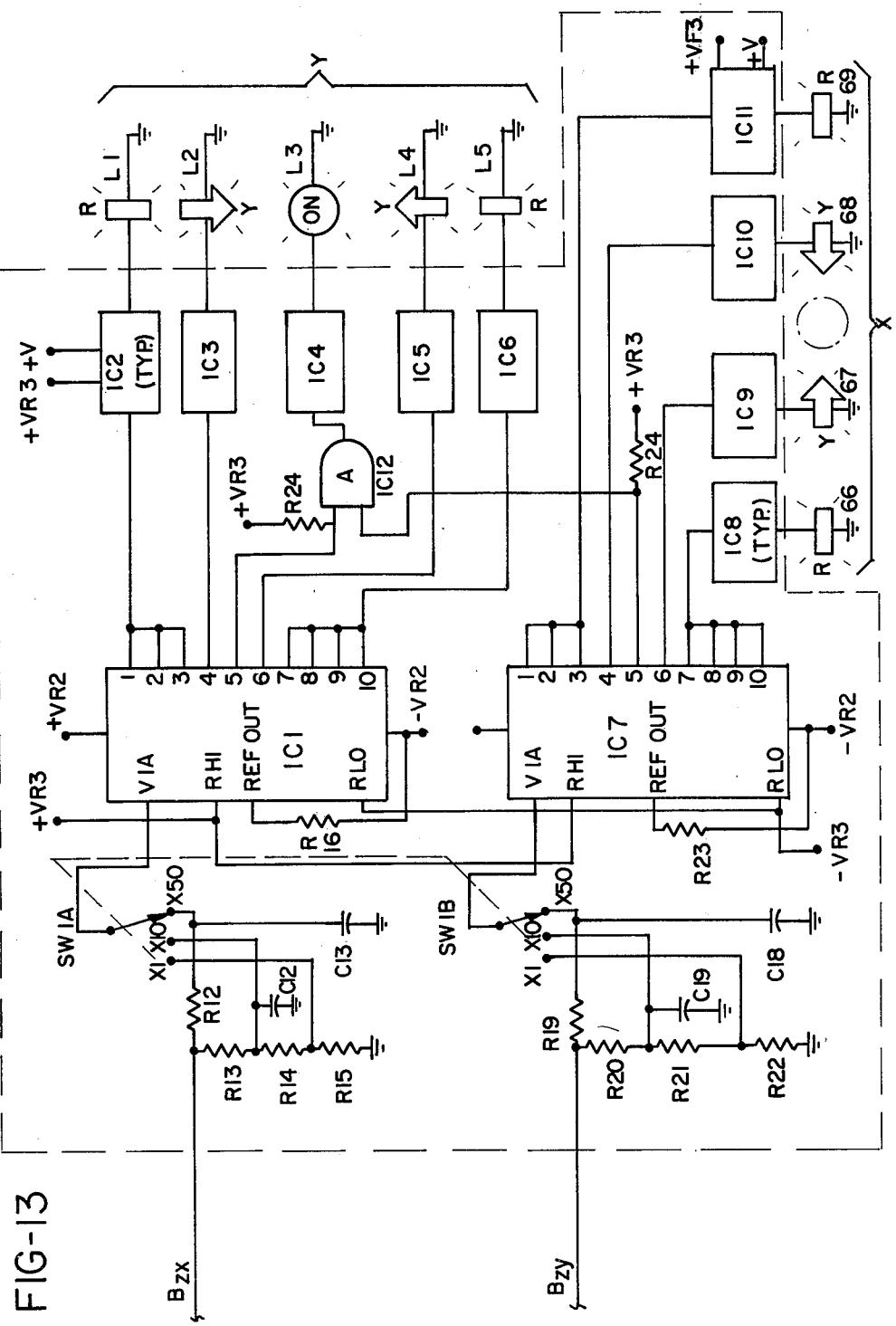

The horizontal direction indicator circuit is illustrated generally in FIG. 8b and partially in FIG. 13. The circuit is very similar to the perpendicularity indicator. The portion of the circuit within the box B1 of FIG. 8b is identical to the circuitry of FIG. 9 in which the strain gages 66 and 68 are replaced with the strain gages 108 and 110 mounted to the lateral position sensing probe 76, as described above. The two bridge high level outputs from this circuit are inputs $B_{zx}$ and $B_{zy}$ in FIG. 13. The circuit of FIG. 13 is identical to the circuit of FIG. 10 with the exception that the amplifiers A2 and A3 and the associated capacitors and resistors are deleted and the inputs $B_{zx}$ and $B_{zy}$ are connected directly to the DVM's IC1 and IC7, respectively, through the voltage divider circuits and sensitivity selector switches SW1. This circuit then operates the second set of indicator lamps L1 through L9 in the same manner that the circuitry of FIGS. 9 and 10 operate the first set of indicator lights L1 through L9, as described above, upon the bending of probe 70.

Figure 14:
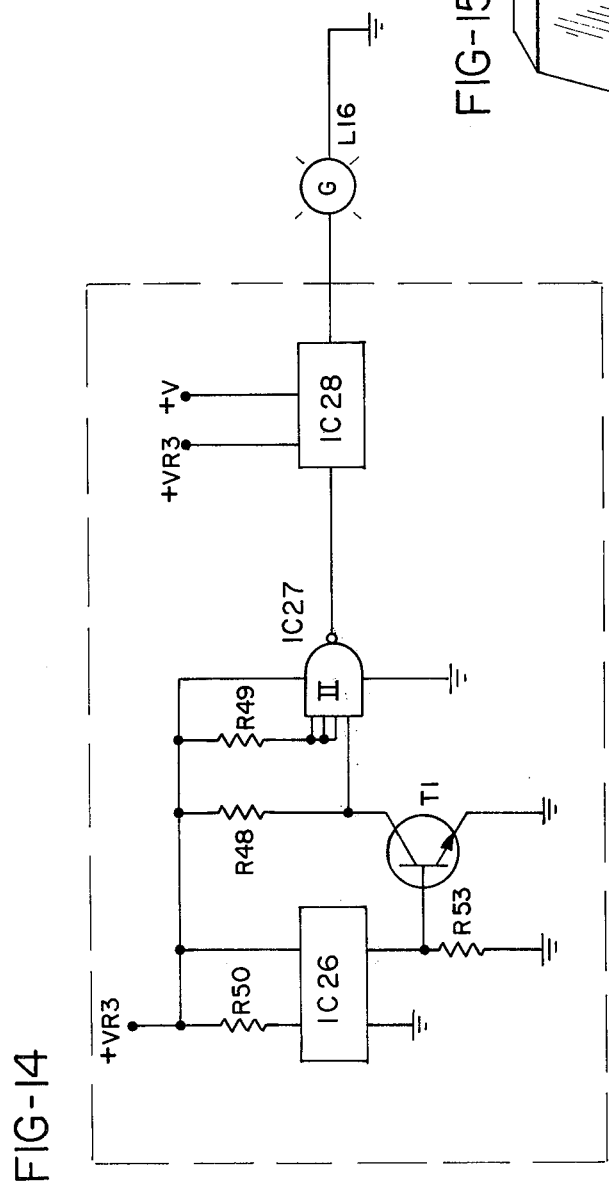

The circumferential position indicator circuit which is associated with the photo detector described above for indicating the rotational alignment of the device with the locking member 24, is illustrated in FIG. 14. IC26 is a very sensitive reflective type line reader containing an infrared LED source and a photo detector in a precision molded plastic holder that aligns the axis of both devices such that the IR source is reflected from the target surface 34 to the photo detector when the device is positioned at the correct height and inclination to the target surface 34. When the device is aligned with the contrasting spot on the surface 34, there is an increase in current from the photo detector IC26. This current is converted to a voltage change by resistor R53 and amplified by transistor T1 to a TTL logic level which trips the Schmidt Trigger NAND gate IC27. The Schmidt Trigger gate has a built-in hysteresis which prevents oscillation of the output when the photo detector is near the switch point. The gate drives optocoupler IC28 to turn on indicator lamp L16.

It is to be understood that the above described circuitry is one means of providing the desired visual indication of movements of the sensing device 10 and that other circuit constructions can be utilized in conjunction with the device to provide either the same visual indications or other indications such as those described in the above referred to related applications. For the sake of clarity, a list of components used in the construction of the above described circuitry is set out below, but is not to be construed as a limitation on the construction of the circuitry portion of the present invention.

ELECTRONICS PARTS LIST

| Item | Description | Type |
|---|---|---|
| A1 | Intersil ICL 7606 CJN | I.C. |
| A2,3 | Intersil ICL 7605 CJN | I.C. |
| A4 | National LM747CN | I.C. |
| C1, 7, 13, 18, 20 | .1 mfd | Capacitor |
| C2-6, 8-11, 14-17 | 1.0 mfd | Capacitor |
| C12, 19 | .20 mfd | Capacitor |
| D1 | 1N4148 | Diode |
| G1-4 | BLH FAET-06C-35-S9ES | Strain Gage |
| IC1, 7, 18 | National LM3914N | I.C. |
| IC2-6, 8-11, 15, 19-23, 28 | Texas Instrument T1L113 | I.C. |
| IC12, 17 | Texas Instrument SN7408 | I.C. |
| IC13 | National LM324N | I.C. |
| IC14 | National LM339N | I.C. |
| IC16 | Texas Instrument SN7404 | I.C. |
| IC24 | Siliconix DG163AP | I.C. |
| IC25 | Texas Instrument NE555 | I.C. |
| IC26 | Texas Instrument T1L139 | I.C. |
| IC27 | Texas Instrument SN74LS13N | I.C. |
| L1-16 | Chicago Miniture CM7382 | Lamp |
| R1 | 240 ohm | Resistor |
| R2 | 2K Pot | Resistor |
| R3, 9, 11, 12, 18, 19, 25, 50 | 100K | Resistor |
| R4, 6, 8, 29-32, 35, 51 | 10K | Resistor |
| R5 | 33K | Resistor |
| R7, 10, 17 | 1M | Resistor |
| R13, 20, 40 | 45.3K | Resistor |
| R14, 21, 41 | 4.02K | Resistor |
| R15, 22, 42, 52 | 1K | Resistor |
| R16, 23, 39 | 1.2K | Resistor |
| R24, 25 | 2.2K | Resistor |
| R26 | 200K - 20 Turn Trimmer | Resistor |
| R28 | 8.2K | Resistor |
| R33 | 330K | Resistor |
| R34 | 4.7K | Resistor |
| R36, 38 | 120K | Resistor |
| R37 | 10K Pot | Resistor |
| R43, 44 | 4.7M | Resistor |
| R53 | 15K | Resistor |
| SW1A-C | Stackpole 73-1097 | Switch |
| SW2 | C&K 7101 | Switch |
| VR1 | National LM317 | Voltage Reg. |
| +V | 15V | Supply Voltages |
| −V | −15V | Supply Voltages |
| +VR1 | +10V | Supply Voltages |
| +VR2 | +8V | Supply Voltages |
| −VR2 | −8V | Supply Voltages |
| +VR3 | +5V | Supply Voltages |
| −VR3 | −5V | Supply Voltages |

In operation, the device 10 is brought into a position in close proximity to the surface 34 and initially visually disposed as perpendicular as possible to the surface. The device 10 is then brought into engagement with the surface so that the probes 54 each touch the surface and so that the probe 70 is positioned in the conical depression 36 in the disc 28. As the pins 54 engage the surface and are thus telescoped into the support member 40, they will bend the cantilevered extensions 64 causing a variation in the voltage output from strain gages 66 and 68 in proportion to the amount of deflection of each of the extensions. This in turn, through the circuitry described above, will produce a lighting of the lights of both the perpendicularity indicator display 120 and the vertical position indicator display 122. During this initial phase of movement of the device 10 the sensitivity switch SW1 should be positioned for the minimum sensitivity so that the indicator lamps provide a more meaningful indication of the general relationship of the device to the target surface 34 and provide an initial indication of the direction which the device is to be moved to both position the device the correct distance from the surface and perpendicular to the surface.

Likewise, on initial contact with the surface the probe 70 is positioned in the conical depression 34 in the disc 28 which results in some side ways deflection of the probe 70, producing a change in the voltage output of one or both of the strain gages 108 and 110 which, in turn, through the circuitry described above, lights the appropriate lamps in the horizontal direction indicator display 124.

At this point, the operator moves the device 10 in the appropriate directions, as indicated by the lamps, in order to bring each of the indicator displays 120, 122 and 124 to the center green position. The operator then adjusts the sensitivity switch SW1 to a greater sensitivity which will produce a change in the light displays.

The operator then again moves the device 10 relative to the surface 34 and the conical depression 36 until each of the light displays is again brought to the center green light. This procedure is continued to the maximum sensitivity as established by switch SW1 and until the operator has finally positioned the device so that each of the indicator displays a center green light which then indicates that the device 10 is positioned correctly on the center line of the locking member 24 and that the device is perpendicular to the surface 34 to the desired extent of sensitivity which is preprogrammed into the circuitry.

The operator then rotates the device while observing the positions of the pointers 114 and 116 until they are brought into alignment. The operator continues to rotate the device until the photo detector senses the spot on the surface of 34 which indicates exact alignment for the locking member 24 which will produce lighting of the lamp L16. It is possible, during rotation of the device that the relative perpendicularity of the device to the surface 34 and its alignment with the access of the locking member 24 may change. This will be indicated through the displays 120, 122 and 124 and additional correction may be necessary by the operator to bring all of the indicator lights to green once the rotational movement of the device has been completed.

Although the preferred embodiment of the present invention as described above was designed mainly to establish perpendicularity between the device and the target surface 34, it is to be understood that it is considered an additional feature of the device to be able to sense an angular relationship between the device and the target surface 34 in a manner as disclosed in the above referred to related applications. Likewise, it is considered that the ability to sense perpendicularlity or angularity of the device relative to the target surface is independent of the horizontal positioning indicator which is utilized in the preferred embodiment. These features combined, however, provide the desired sensitivity for the environment in which this device is described above.

The term transducer means, as used herein, is intended to be utilized in its broadest sense to encompass all of the various types of transducers which are capable of providing the necessary indication of the relative position of the sensing device of the present invention to a surface. Such transducer means include many of the light sensing types, such as photo detectors and light emitting diodes. It further includes sonic detectors, magnetic and electric detectors, such as inductance, reluctance and capacitance type of detectors. For example, it is anticipated that the pins 54 and associated transducer means, which includes the cantilevered extensions 64 and strain gages 66 and 68, can be replaced by any of the various transducer means indicated above which could provide the necessary indication of the distance from the target surface to the support member and the necessary indication of angularity and/or perpendicularlity, as desired.

While the form of apparatus herein described constitutes a preferred embodiment of this invention, it is to be understood that the invention is not limited thereto, and that changes may be made therein without departing from the scope of the claims.

What is claimed is:

1. A position sensing device, comprising:
   a support member;
   a plurality of angular position sensing probes movably mounted within and extending from said support member for simultaneously engaging a surface;
   first transducer means mounted to said support member and engaging said probes for sensing movement thereof and providing electrical signals indicative of the positions of each said probe relative to said support member; and
   means receiving said signals from said transducer means and providing an indication of the relative angular position of said support member to said surface and of the distance from said support member to said surface.

2. A position sensing device as defined in claim 1 wherein said angular position sensing probes are each mounted in said support member for rectilinear movement along parallel spaced axes.

3. A position sensing device as defined in claim 2 wherein each said angular position sensing probe is independently movable relative to the others of said last named probes.

4. A position sensing device as defined in claim 2 or 3 wherein said angular position sensing probes are equally radially and angularly spaced about a central axis and each probe is movable with respect to said central axis.

5. A position sensing device as defined in claim 4 wherein there are four angular position sensing probes.

6. A position sensing device as defined in claim 4 wherein said support member is rotatable about said central axis and means is mounted on said support member for indicating a rotationally aligned position relative to said surface.

7. A position sensing device, comprising:
   a support member;
   a plurality of angular position sensing probes movably mounted within and extending from said support member for simultaneously engaging a surface;
   first transducer means mounted to said support member and engaging said probes for sensing movement thereof and providing electrical signals indicative of the positions of each said probe relative to said support member;
   means receiving said signals from said transducer means and providing an indication of the relative angular position of said support member to said surface;
   a lateral position sensing probe movably mounted to said support member and extending therefrom for engaging a discontinuity in said surface so as to cause bending of said lateral position sensing probe upon lateral movement of said support member;
   second transducer means engaging said lateral position sensing probe for sensing bending thereof and providing an electrical signal indicative of the degree of bending; and
   means receiving said signal from said lateral position sensing probe and providing an indication of the degree of bending of said lateral position sensing probe.

8. A position sensing device, comprising:
   a support member;
   a plurality of angular position sensing probes movably mounted within and extending from said support member for simultaneously engaging a surface;

first transducer means mounted to said support member and engaging said probes for sensing movement thereof and providing electrical signals indicative of the positions of each said probe relative to said support member;

means receiving said signals from said transducer means and providing an indication of the relative angular position of said support member to said surface;

a housing telescopically engaging said support member and having means for limiting the extent of movement of said support member relative to said housing both toward and away from each other;

spring means biasing said support member in its outermost position relative to said housing; and means mounted to said housing and engaging said support member for providing a signal indicating movement of said support member relative to said housing.

9. A position sensing device, comprising:

a support member;

a plurality of angular position sensing probes movably mounted within and extending from said support member for simultaneously engaging a surface when said support member is moved into proximity with said surface;

first transducer means mounted to said support member and engaging said probes for sensing movement thereof and providing electrical signals indicative of the positions of each said probe relative to said support member;

means receiving said signals from said transducer means and providing an indication of the relative angular position of said support member to said surface and of the distance from said support member to said surface;

a lateral position sensing probe movably mounted to said support member and extending therefrom for engaging a discontinuity in said surface so as to cause bending of said lateral position sensing probe upon lateral movement of said support member;

second transducer means engaging said lateral position sensing probe for sensing bending thereof and providing an electrical signal indicative of the degree of bending; and means receiving said signal from said lateral position sensing probe and providing an indication of the degree of bending said lateral position sensing probe.

10. A position sensing device as defined in claim 9 wherein said angular position sensing probes are each independently movably mounted in said support member for rectilinear movement along parallel spaced axes and equally radially and angularly spaced about a central axis and movable parallel to said central axis.

11. A position sensing device as defined in claim 9 wherein there are four angular position sensing probes.

12. A position sensing device as defined in claim 9 wherein said first transducer means includes a plurality of flexible members one each associated with each said angular sensing probe, and a plurality of strain gauges associated with each said flexible member which provide signals proportional to the extent of flexing of said flexible members upon movement of said angular position sensing probes.

13. A position sensing device as defined in claim 9 wherein said second transducer means includes a plurality of strain gages mounted to said lateral position sensing probe in spaced relation for providing output signals which together indicate the direction and extent of bending of said lateral position sensing probe.

* * * * *